(12) United States Patent
Tembaak et al.

(10) Patent No.: US 8,268,743 B2
(45) Date of Patent: Sep. 18, 2012

(54) PLUGGAGE REMOVAL METHOD FOR SCR CATALYSTS AND SYSTEMS

(75) Inventors: Carsten Tembaak, Tega Cay, SC (US); Birgit L. Marrino, Charlotte, NC (US); Albert Joseph Stier, Charlotte, NC (US)

(73) Assignee: Steag Energy Services GmbH, Essen (DE)

( * ) Notice: Subject to any disclaimer, the term of this patent is extended or adjusted under 35 U.S.C. 154(b) by 0 days.

(21) Appl. No.: 13/100,787

(22) Filed: May 4, 2011

(65) Prior Publication Data
US 2011/0207597 A1 Aug. 25, 2011

(51) Int. Cl.
*B01J 38/04* (2006.01)
*B01J 38/12* (2006.01)
*B24B 1/00* (2006.01)
*B24C 1/00* (2006.01)

(52) U.S. Cl. ............... 502/34; 502/38; 451/38

(58) Field of Classification Search .............. 502/20–34, 502/35, 38–42, 55
See application file for complete search history.

(56) References Cited

U.S. PATENT DOCUMENTS

| | | | |
|---|---|---|---|
| 6,162,113 A | 12/2000 | Armstrong | |
| 6,299,695 B1 | 10/2001 | Gilgen | |
| 6,387,836 B1 | 5/2002 | Dorr et al. | |
| 6,913,026 B2 * | 7/2005 | Winnestaffer et al. | 134/22.18 |
| D608,856 S | 1/2010 | Dammkoehler | |
| 7,708,620 B2 | 5/2010 | Kipp | |
| 7,723,251 B2 | 5/2010 | Hartenstein et al. | |
| 7,741,239 B2 | 6/2010 | Hartenstein et al. | |
| 2001/0000165 A1 | 4/2001 | Armstrong | |
| 2007/0161509 A1 | 7/2007 | Bruggendick et al. | |
| 2008/0115800 A1 | 5/2008 | Blohm | |
| 2008/0176487 A1 | 7/2008 | Armstrong | |
| 2008/0216870 A1 * | 9/2008 | Merritello | 134/8 |
| 2009/0209417 A1 | 8/2009 | Bruggendick et al. | |
| 2009/0239735 A1 | 9/2009 | Bruggendick et al. | |

OTHER PUBLICATIONS

Clean Harbors, "Dry Ice Blasting" (Apr. 9, 2010).*
"Cool Blast". Cool Blast Equipment Company, 2003-2008. pp. 1-3. http://www.dryiceblastingusa.com/cool_blast_process.htm.*
"Cool Blast" before picture, 2003-2008.*
"Cool Blast" after picture, 2003-2008.*
"Two hose vs One hose systems" information pamphlet from Cold Jet LLC, available at http://www.coldjet.com/en/information/two-hose-vs-one-hose.php (last visited Apr. 7, 2011).
PHX-150 Dry Ice Cleaning System, Phoenix Unlimited LLC, sales brochure, available at http://www.dryiceblastingusa.com/documents/phx-150-brochure.pdf (last visited Apr. 7, 2011).

* cited by examiner

*Primary Examiner* — Colleen Dunn
*Assistant Examiner* — Jennifer Smith
(74) *Attorney, Agent, or Firm* — K&L Gates LLP

(57) ABSTRACT

The present disclosure relates to methods for treating an SCR catalyst or components of an SCR system having a decreased $NO_x$ potential efficiency as a result of particulate pluggage in the system or in one or more channels in the SCR catalyst which renders at least a portion of the catalytic active areas inaccessible for the flue gas. The methods include removal of the particulates and plug(s) using a blasting stream of a pressurized carrier gas having a particulate blasting medium directed at the SCR catalyst or component of an SCR system.

18 Claims, 8 Drawing Sheets

Untreated portion with gray color

Treated portion without gray color

PLUGGAGE REMOVAL METHOD FOR SCR CATALYSTS AND SYSTEMS

TECHNICAL FIELD OF THE INVENTION

The present disclosure describes novel methods for removing particulate materials from an Selective Catalytic Reduction (SCR) catalyst and components of an SCR system.

BACKGROUND OF THE INVENTION

High temperature thermal processes, for example, generation of steam for the production of electricity in power plants utilizing fossil fuels, often create environmentally harmful by-products. These compounds, including nitrogen oxides ($NO_x$) and sulfur dioxide ($SO_2$) must be removed from the flue gases of the high temperature thermal processes before the gases are discharged into the environment, for example before exiting the power plant and contacting the environment.

The standard for removing nitrous oxides from flue gases is the selective catalytic reduction (SCR) process using an SCR catalyst (also called a DeNOx catalyst), where a reducing agent, typically ammonia, is injected and mixed into the flue gases, and sent through a catalytic reaction chamber where the catalyst facilitates the reduction of $NO_x$ using the reducing agent to form elemental nitrogen ($N_2$) and water.

Desulphurization of the flue gas, for example removal of $SO_2$, may be carried out by applying known methods in which the $SO_2$ produced in the combustion process is oxidized to $SO_3$. This is done prior to exposure of the flue gases to the reduction catalyst. The $SO_3$ may then be absorbed into alkaline solution and removed from the process, usually in the form of gypsum.

The flue gases from the combustion processes also typically contain fly ash particulates formed during the combustion process. Fly ash and other particulates may accumulate in the SCR catalyst or in or on various components of an SCR system. Removal of fly ash from the flue gas may involve various technologies depending on the physical properties of the fly ash. The physical properties of the fly ash varies depending on the fuel type and the operating conditions in the thermal processes. The fly ash can range from a fine powder to Large Particle Ash (LPA also known as "popcorn ash", from about 0.1 cm to about 2.5 cm) and can develop into large chunky pieces (from about 2.5 cm to about 13 cm or even larger) when it accumulates in or on the SCR catalyst surface and passageways or on components of an SCR system. The various types of fly ash form in the boiler and easily carry over into the SCR reactor causing accumulation and plugging of the various components of the SCR system, which can lead to one or more of the following: maldistribution of the flue gas, loss of catalytic performance through loss of available DeNOx potential, unacceptable $NH_3$ slip, excessive pressure drop and catalyst erosion damage. Fine powder fly ash may be removed using Electro Static Precipitators (ESP), which are typically installed upstream and/or downstream of the SCR system depending on the SCR arrangement (i.e., high dust, low dust or tail end arrangement). The LPA, also known as popcorn ash, can be collected prior to the SCR reactor by means of LPA screens, which are typically located in the flue gas stream between the economizer outlet and the SCR inlet.

Despite the above mentioned technologies, the fly ash removal may not be sufficient to protect the catalyst or the various components of the SCR system from plugging by or accumulation of fly ash particulates, which can lead to premature loss of SCR performance. For example, loose powder can plug channels of honeycomb-type and corrugated-type catalysts with individual channels becoming partially or fully inaccessible to flue gas. Furthermore, chunky fly ash particulates and LPA can deposit on top of the catalyst module or on other components of the system, blocking the flue gas passage through honeycomb-, plate-, or corrugated-type SCR catalyst modules and access to the catalytic surfaces. Popcorn ash can travel into the channels of honeycomb, corrugated, or plate SCR catalysts and deposit in the channel where it can become wedged between the channel walls, blocking flue gas flow and providing an environment for further fly ash particulates to accumulate and plug the channel. The result can be a catalyst with pluggage ranging from 5% to 100% and reduced $NO_x$ removal efficiency.

In addition, it is generally know in the regeneration of SCR catalysts that the physical cleaning of the catalyst to remove any loose fly ash accumulated on the module frame, box frame, on top of the catalyst and within the various passageways of the catalyst, for example plugs within the catalyst channels, is an important step prior to a subsequent wet-chemical based regeneration process. Removal of fly ash plugs prior to wet-chemical regeneration ensures that loose fly ash particulates are not carried into the treatment tanks or accumulate in the chemical solutions used during the regeneration processes where the fly ash particulates could potentially cause problems, such as plugged equipment, damaged equipment due to the abrasive effects of the fly ash and a reduced effectiveness of the chemicals in the process. Therefore, reducing the amount of loose fly ash particulates results in decreased discharge rates of chemical solutions, savings in chemical solutions, and preventing mechanical failures due to abrasive corrosion. Further, removal of the fly ash prior to wet-chemical treatment may also decrease the accumulation of catalyst poisons, such as iron, in the treatment tanks.

SCR catalyst structures, such as honeycomb, plate, and corrugated catalyst are typically dry cleaned using vacuuming, blowing with compressed air, or manually cleaned using scrapers and poking devices of various shapes and forms. The SCR catalysts may also be pressure washed to remove fly ash plugs. However, pressure washing of the catalyst can dissolve catalyst poisons present in the fly ash (e.g., iron) and deposit them on the catalyst surface or surface of other components in the SCR system. Further, water from pressure washing may react with $SO_3$ on the catalyst or in the fly ash to form sulfuric acid ($H_2SO_4$), which is corrosive to the module frame and plate catalyst support material surfaces and can result in further liberation of iron as the module is left to dry in the environment. Water from pressure washing may also cause fly ash to harden within channels and in between plates if left to dry.

Thus, there remains a need for additional and effective dry physical cleaning methods to not only remove fly ash from an SCR catalyst and system, but also to open and unplug catalyst channels and provide an accessible catalyst surface prior to a wet-chemical rejuvenation or regeneration process. Further, there is a need for alternative fly ash removal methods that can be applied to the SCR catalyst in situ, when the catalyst is still installed on-site in the SCR reactor, or ex situ, where the catalyst module is removed from the reactor and treated either on-site or at a regeneration facility.

BRIEF DESCRIPTION

The present disclosure provides for methods for removing accumulated particulates, such as fly ash plugs, from an SCR catalyst or in or on various components in an SCR system.

According to a first embodiment, the present disclosure provides a method for removing accumulated particulates from one or more components of an SCR system. The method comprises treating one or more components of an SCR system with a blasting stream comprising a pressurized carrier gas and a particulate blasting medium directed at at least one surface of the one or more components, and removing at least a portion of accumulated particulates from at least one surface of the one or more components. In particular embodiments, the component of the SCR system may comprise an SCR catalyst.

Other embodiments of the present disclosure provide a method for removing accumulated particulates from an SCR catalyst or components of an SCR system. The method comprises treating an SCR catalyst or components of an SCR system with a blasting stream comprising a pressurized carrier gas and dry ice particulates directed at at least one surface of the SCR catalyst or components of an SCR system, and removing at least a portion of accumulated particulates from the SCR catalyst or components.

Another embodiment of the present disclosure provide a method for removing accumulated particulates from an SCR catalyst or components of an SCR system. The method comprises treating an SCR catalyst or components of an SCR system with a blasting stream comprising a pressurized carrier gas and a particulate blasting medium directed at at least one surface of the SCR catalyst or components of an SCR system, and removing at least a portion of accumulated particulates from the SCR catalyst or components. The particulate blasting medium comprises a particulate selected from the group consisting of aluminum oxide particulates, sand or silica particulates, silicon carbide particulates, crushed glass, glass beads, plastic beads, pumice, steel shot, steel grit, corn cob particulates, nut shell particulates, soda particulates, ice particulates, and combinations of any thereof.

In addition to removing the accumulated particulates, the methods of various embodiments described herein may also comprise removing at least a portion of one or more colored deposits from various components of an SCR system, such as an end of the SCR catalyst.

DESCRIPTION OF THE DRAWINGS

The various embodiments of the present disclosure will be better understood when read in conjunction with the following figures, wherein.

DETAILED DESCRIPTION

Figure 1A:
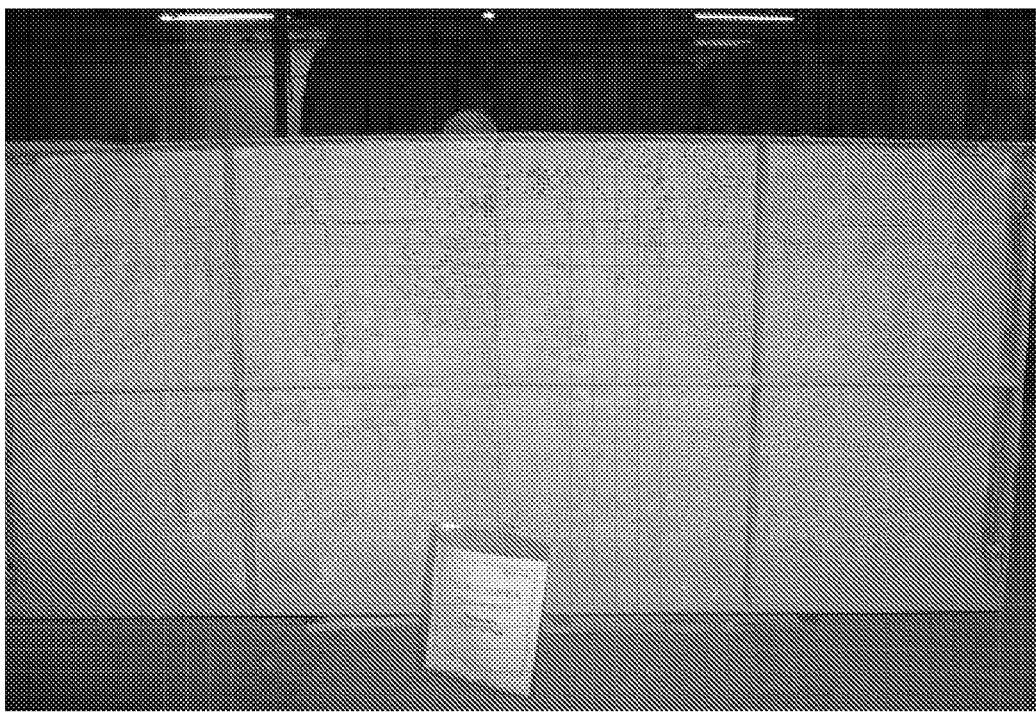
FIG. 1A illustrates a honeycomb SCR catalyst with fly ash plugs prior to treatment and FIG. 1B shows the same honeycomb SCR catalyst after treatment with dry ice blasting according to one embodiment of the present disclosure.

The present disclosure describes methods for removing accumulated particulates or plugs from one or more components of an SCR system, such as an SCR catalyst, using a blasting stream comprising a pressurized carrier gas and a particulate blasting medium. The blasting process may remove plugs resulting from the accumulation of particulates, such as fly ash particulates, on at least one surface of the components of the SCR system.

Other than the operating examples, or where otherwise indicated, all numbers expressing quantities of ingredients, processing conditions and the like used in the specification and claims are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, may contain certain errors, such as, for example, equipment and/or operator error, necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

Any patent, publication, or other disclosure material, in whole or in part, recited herein is incorporated by reference herein but only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes several different features and aspects of the invention with reference to various exemplary non-limiting embodiments. It is understood, however, that the invention embraces numerous alternative embodiments, which may be accomplished by combining any of the different features, aspects, and embodiments described herein in any combination that one of ordinary skill in the art would find useful.

DEFINITIONS

As used herein, the term "components of an SCR system" refers to equipment and flue components between the boiler of a power plant and the exit from the SCR catalyst, including the SCR catalyst module and any equipment exposed to flue gas, including, for example, the catalyst material and surfaces, LPA screens, flue gas rectifier grids upstream or downstream of the SCR catalyst, catalyst dummies installed at any point of the SCR system, and SCR system and catalyst support structures (which hold the catalyst modules or other SCR system components in place), which come into contact with flue gas and particulates, such as fly ash particulates.

As used herein, the term "SCR catalyst" refers to a selective catalytic reduction catalyst designed for the removal of $NO_x$ from flue gases produced during combustion processes for the production of electricity in power plants utilizing fossil fuels and/or biofuels and/or biomass and during the incineration of domestic waste. The SCR catalyst utilizes a reducing reagent, such as ammonia, injected into the flue gas stream and sent through a catalytic reaction chamber where the catalytic materials facilitate the reduction of various $NO_x$ components in the flue gas with the reducing agent to form elemental nitrogen and water. SCR catalysts may also be called "DeNOx catalysts". SCR catalysts typically have a structure comprising a honeycomb-type catalyst set-up, a corrugated-type catalyst set-up, and a plate-type catalyst set-up which maximize catalytic surface area. While the recited catalyst structures are most common in the art, other catalyst structures and conformations are possible and are included within scope of the present invention and included in the definition of "SCR catalyst". As used herein the term "SCR catalyst" includes the catalytic material, catalyst substrate (such as, but not limited to, titanium oxide), catalyst support material (such as, but not limited to, metal mesh, for example in plate-type catalysts), catalyst support structure, and any framework holding the support structure to form the catalyst module.

As used herein, the term "channels" when used in reference to an SCR catalyst means the open spaces between the catalytic surfaces of the SCR catalyst, for example, the channels of a honeycomb catalyst or corrugated catalyst and between the plates in a plate-type catalyst.

As used herein, the term "particulates" includes, but is not limited to, combustion by-products, such as fly ash, and metallic or other components from reactor or flue structures. Particulate size may range from a fine powder (having a size as small as about 1 µm) to large particulates (having a size of about 5 inches or even larger).

As used herein, the term "fly ash" means a combustion by-product produced in power plant operation and can include fly ash of any size, ranging from fine powder fly ash, large particle ash (LPA, also called "popcorn ash") and larger chunky pieces of ash.

As used herein, the term "particulate blasting medium" means any suitable particulate that can be expelled towards a surface or contaminant using a pressurized carrier gas. The particulate blasting medium may have a size ranging from about 0.05 mm up to 20 mm.

As used herein, the term "dry ice" means solid carbon dioxide ($CO_2$) and may be in the form of a powder up to dry ice particulates or pellets and having a size ranging from about 0.05 mm up to 20 mm.

As used herein, the term "in situ" means while installed in the normal location of operation and the term "ex situ" means uninstalled or removed from the normal location of operation.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Blasting Method

The present disclosure provides a method for removing accumulated particulates from one or more components of an SCR system. According to various embodiments, the methods may comprise treating the one or more components of an SCR system with a blasting stream directed at at least one surface of the one or more components and removing at least a portion of the accumulated particulates from the one or more components. The blasting stream according to various embodiments may comprise a pressurized carrier gas and a particulate blasting medium.

The methods described herein are designed to remove accumulated particulates from the one or more components such as particulates selected from the group consisting of fly ash particulates, metallic components from reactor or flue structures, packing material from between the catalyst and the module frame, insulation material from ductwork, particulates from other sources in the system, and combinations of any thereof. For example, during combustion processes in fossil fuel or biomass fired power plants, combustion exhaust flue gas comprising fly ash is produced and exhausted from the power plant. Prior to leaving the power plant, the flue gas passes through a variety of passageways including an SCR system designed to remove certain constituents, such as nitrogen oxides ($NO_x$), from the flue gas. Fly ash particulates may deposit or otherwise become trapped in or on various surfaces of various components of the SCR system, including for example, on the SCR catalyst or in the various passageways of the SCR catalyst. In addition, mechanical failure or breakdown of certain components of the power plant flue system may result in small metallic components (such as, for example, nut and/or bolts or broken metallic pieces), packing material from between the catalyst and/or between the catalyst and the module frame, insulation material from ductwork, and other materials that may become trapped in or on the SCR system or SCR catalyst. Accumulation of these particulates results in decreased catalytic activity and removal of these particulates is necessary to regenerate the SCR catalyst and system to optimum performance. Fly ash particulates that may accumulate on the structures and surfaces of the SCR system may have a variety of sizes from fly ash dust or powder, to large particle ash (LPA or popcorn ash)

having a size of about 0.1 cm to about 2.5 cm to large chunky fly ash pieces having a size of about 2.5 cm to about 13 cm or even larger.

According to various embodiments, the blasting stream comprises a pressurized carrier gas that propels the particulate blasting medium at the at least one surface of the one or more components of the SCR system. The carrier gas may be any suitable gas that may be pressurized. Examples of suitable carrier gases include, but are not limited to, air, nitrogen, carbon dioxide, inert or noble gases, and mixtures of any thereof. The carrier gas may be pressurized to a pressure sufficient to cause the blasting stream to leave the nozzle of the blasting device at a pressure ranging from about 17.4 psig to about 4000 psig (about 900 torr to about $2.07 \times 10^5$ torr). In specific embodiments, the pressurized carrier gas may be air. According to certain embodiments, the pressurized air may have a dew point ranging from about 0° C. to about 38° C. Numerous different nozzle configurations may be used to treat the SCR system including nozzle configurations that allow access to small crevices in the system and the honeycomb or corrugated channels in an SCR catalyst.

In particular embodiments of the present disclosure, the particulate blasting medium may be dry ice ($CO_2(s)$) particulates. According to these embodiments, the one or more components of the SCR system may be cleaned using a dry ice blasting system. Suitable dry ice blasting systems include both single-hose and two-hose dry ice blasting systems.

Dry ice blasting may be particularly suited for cleaning components of an SCR system, including an SCR catalyst, and involves propelling dry ice particulates, such as pellets, at the surface or object to be cleaned at extremely high speed. The actual dry ice particulates are softer and less dense than many conventional blasting mediums. Upon impact, the dry ice particulates sublimate almost immediately, transmitting minimal kinetic energy to the surface on impact and producing minimal abrasion. In addition, the sublimation process absorbs a large volume of heat from the surface, producing shear stresses due to the thermal shock. It is believed that this improves the cleaning performance of the dry ice particulates as the top layer of fly ash or other contaminant is expected to transfer more heat than underlying substrate and therefore, flake off more readily. The efficiency and effectiveness of the blasting process may depend on the thermal conductivity of the substrate and the contaminant. Further, the rapid change in state from solid to gas may also cause microscopic shock waves, which are also thought to assist in loosening and removal of the particulate contaminants. An additional advantage of the dry ice blasting medium is that, because the dry ice particulates sublimes directly to a gas, the blasting process leaves no chemical residue on the surface of the SCR component.

According to other embodiments, the particulate blasting medium may comprise a particulate selected from the group consisting of aluminum oxide particulate, sand or silica particulates, silicon carbide particulates, crushed glass, glass beads, plastic beads, pumice, steel shot, steel grit, corn cob particulates, nut shell particulates such as walnut shell, pecan shell, apricot nut, or other suitable nut shells, soda particulates, ice particulates, and combinations of any thereof. Use of any of these particulate materials may generally be called "abrasive blasting", defined as forcibly propelling a stream of abrasive material against a surface under high pressure to smooth a rough surface, roughen a smooth surface, shape a surface, or remove surface contaminants. The final choice of abrasive blasting media depends on the nature of the work required and on the blasting equipment employed. In the context of the present disclosure, the intent of the abrasive blasting is to remove contaminants, such as particulate contaminants, pluggage, and/or colored contaminants of a component of an SCR system with little or no affect on the underlying surface material of the component.

According to various embodiments, the methods described herein are effective at removing the accumulated particulate matter, such as fly ash particulates, from one or more components of an SCR system. According to certain embodiments, treating the one or more components may result in removing up to about 100% of the accumulated particulates from the component of the SCR system. In other embodiments, the methods may remove from about 25% to about 100% of the accumulated particulates, and in other embodiments from about 50% to about 100% or even about 70% to about 100% of the accumulated particulates. In certain embodiments where one or more channels of the catalyst are plugged, the treatment method may remove the entire plug or, alternatively remove at least a portion of the plug (e.g., by cracking the plugging material or creating a hole in the plug) so that chemicals and solutions in the wet chemical treatment process may contact portions of the remaining plugging material and further remove at least a portion of the remaining particulate material (such as fly ash) and/or so that the wet chemical treatment components used in the rejuvenation/regeneration process can access and rejuvenate/regenerate the catalyst surfaces in the channel behind the plug or covered by the plug material.

The various embodiments of the present disclosure allow for treating the component of the SCR system in situ while the component is still installed in its normal location of operation. Treating the component in situ allows for removal of the particulate materials without the additional cost of removing the component and/or transporting the component to a cleaning facility. Those embodiments which comprise using dry ice blasting of the component of the SCR system may be particularly suited for in situ treating to remove the particulate materials, since the dry ice particulate blasting medium sublimes at room temperature leaving no blasting material that must be cleaned or removed from the SCR system after treating. However, other blasting medium may also be used in situ, since the used blasting medium could simply be removed with the particulates, such as the fly ash particulates that have been removed from the system. The present methods provide the capability for in situ dry cleaning of the SCR component or SCR catalyst where the physical contamination (i.e., presence of particulate materials) outweighs the chemical contamination, thereby extending the catalyst operation lifetime between removal and cleaning/regeneration. Alternatively, the component may be treated ex situ with the component removed from its normal location of operation. Due to the portable nature of the treating method, once the component has been removed from the location of operation, it may be treated on-site, thereby saving on transportation costs. In other embodiments, the component may be transported off-site to a treatment facility and treated to the methods described herein and potentially other treatment or regeneration processes at the treatment facility.

In specific embodiments the component of the SCR system may comprise an SCR catalyst. The SCR catalysts may have a honeycomb-type catalyst structure having a plurality of channels through which flue gas can move and react with the catalyst on the channel surfaces. In other embodiments, the SCR catalyst may have a corrugated-type catalyst structure having corrugations that form channels through which flue gas can move and react with the catalyst on the channel surfaces. In other embodiments, the SCR catalyst may have a plate-type catalyst structure with a plurality of parallel plate structures with spaces in-between the plates through which flue gas can move and react with the catalyst on the plate surfaces. In each of these types of catalysts, fly ash and other particulates can become stuck or wedged in the channels or spaces, leading to fly ash plugs which can restrict the flow of flue gas and limit access to the catalytic surfaces. Therefore, treating the SCR catalyst to remove the accumulated particulates is important for optimum catalytic performance. In addition, the present methods allow for removal of the accumulated particulates to render the channels open and accessible for chemicals applied in subsequent regeneration processes.

Depending on the type of usage of the SCR catalyst, for example, but not limited to the type of fuel burned in the power plant and the length of time that the SCR catalyst has been installed prior to treating, the channels of the SCR catalyst may be partially or completely plugged with particulate materials, such as fly ash. In certain embodiments, the channels of the SCR catalyst may have a percent pluggage ranging from about 10% up to about 100% and in other embodiments the percent pluggage may range from about 50% to about 100%.

In those embodiments for treating the SCR catalyst, the SCR catalyst may be treated in any position that effects removal of the accumulated particulates. For example, according to one embodiment, the SCR catalyst may be treated in a vertical position, i.e., where the channels are oriented in a vertical direction. In this embodiment, the SCR may be treated in a vertical position in situ while still installed in the SCR system, since the SCR catalyst module is typically installed in a vertical orientation. In other embodiments, the SCR catalyst module may be oriented in situ in a horizontal orientation and may be treated in situ in the horizontal orientation. Alternatively, the SCR catalyst may be treated in a vertical position at a treatment facility, for example while placed on a table with a grated top which allows fly ash and other particulates to gravity fall out of the module onto the floor or into a collection device once loosened by the blasting process. According to another embodiment, the SCR catalyst may be treated in a horizontal position, i.e., where the channels are oriented in a horizontal direction. Treating the SCR catalyst in the horizontal position, for example ex situ, may more readily allow directing the nozzle of the blasting equipment at or in the channels of the SCR catalyst.

The SCR catalyst will have a flue gas inlet side (i.e., the side of the catalyst with the channels directed toward the source of flue gas) and a flue gas outlet side (i.e., the side of the catalyst with the channels directed away from the source of flue gas). According to one embodiment, treating the SCR catalyst may comprise directing the stream of pressurized carrier gas and the particulate blasting medium at the flue gas inlet side of the SCR catalyst. According to another embodiment, treating the SCR catalyst may comprise directing the stream of pressurized carrier gas and the particulate blasting medium at the flue gas outlet side of the SCR catalyst. Still other embodiments of the methods may involve alternately directing the stream at the flue gas inlet and the flue gas outlet side. All these embodiments are designed to maximize displacement of the accumulated particulate material on the SCR catalyst and within the channels.

Still further embodiments of the method of the present disclosure may comprise removing at least a portion of one or more colored deposits from an end of the SCR catalyst using the blasting stream. While in use, the SCR catalyst may develop colored deposits, such as a reddish or orange colored deposit or a gray colored deposit, on the surfaces of the catalyst. Such colored deposits may result from metal compounds or other contaminants in the flue gas that come from burning various fuel types or fuels from various sources; from the interior surfaces of the flue duct material, for example, due to the abrasive effects of fly ash; or from other sources. The contaminants may include metals or other fuel contaminants that are vaporized during the combustion process or abraded from the duct material and deposit on the catalyst surface. For example, it is believed that the reddish color may be due to the deposition of iron containing contaminants. Iron compounds and/or iron salts may physically and chemically bond to the catalyst surface further reducing the performance of the catalyst. Research suggests that iron ions may be the main cause of the enhanced and undesired conversion of $SO_2$ to $SO_3$ during the regular operation of the SCR catalyst in the power plant. The $SO_3$ may then react with water in the flue gas to form sulfuric acid. The sulfuric acid may then react with downstream components of the flue gas emission system to corrode or oxidize those components, potentially leading to component failure.

According to certain embodiments, removal of the one or more colored compounds may be effected by treating the catalyst with the blasting stream. Treating the SCR catalyst, for example, at the flue gas inlet side of the SCR catalyst with the blasting stream according to the various embodiments described herein may remove at least a portion of the colored deposits on the treated surfaces. Similarly, the flue gas outlet side may also be treated to remove any colored deposits. According to these embodiments, the removal of the colored deposits may be effected to a depth into the channels of up to 20 mm, or in other embodiments up to 15 mm or in certain embodiments up to 10 mm from the inlet or outlet side of the SCR catalyst. Removal of coloration at a greater depth is generally not possible due to the limited access to the catalyst surfaces deeper within the channels. In embodiments which involve plate type SCR catalysts where the plates can be disassembled and treated separately, removal of at least a portion of the one or more colored compounds may be effected over the entire surface of the catalyst plates. According to these embodiments, any blasting medium may be used to remove at least a portion of the colored deposits from the surface of the SCR catalyst. However, a more abrasive blasting media, such as aluminum oxide particulates, sand or silica particulates, silicon carbide particulates, crushed glass, glass beads, plastic beads, pumice, steel shot, steel grit, corn cob particulates, nut shell particulates, soda particulates, coal slag, and combinations of any thereof as described herein, may show greater removal of the colored deposits. Care should be taken to minimize any abrasion of the underlying SCR catalyst and ceramic or metallic catalyst support material during removal of the one or more colored deposits. The various embodiments of the various treating methods described herein may also be used to remove at least a portion of any colored deposits from surfaces of other components of the SCR system. In specific embodiments, SCR catalysts which have colored deposits but do not have substantial accumulations of particulates may be treated according to the embodiments herein, including treating the SCR catalyst with a blasting stream comprising a pressurized carrier gas and a particulate blasting medium directed at at least one surface of the SCR catalyst having one or more colored deposits and removing at least a portion of the one or more colored deposits from the catalyst surface.

In other embodiments of the present disclosure, the SCR catalyst may be further subjected to a pretreatment process or a post treatment process. For example, according to one embodiment, the methods described herein may further comprise subjecting the SCR catalyst to one or more dry cleaning processes either prior to or after treating the SCR catalyst with the blasting stream. Various dry cleaning processes to remove particulates, particularly loose particulates, such as fly ash particulates, include for example, vacuuming the catalyst (i.e., using the suction of a vacuuming device to remove loose particulate materials), air blowing (i.e., treating the catalyst with compressed air stream to remove loose particulate materials), shaking the catalyst do dislodge loose particulate materials, scraping a surface of the catalyst with a scraper to remove particulate materials, and poking into the channels of the catalyst to remove particulate materials therein. All of these dry cleaning processes may be effective in removing a portion of the particulate materials. However, none of the dry cleaning processes are entirely effecting in removing all particulate materials, can be man-power intensive, and can potentially damage the catalyst surface or structure material (such as poking and scraping). When combined with the various blasting methods described herein, the recited dry cleaning methods may result in greater removal of particulate materials from the SCR catalyst. For example, the inventive methods and dry cleaning methods may complement each other in dislodging, loosening and, removing particulate materials such as fly ash plugs from the channels of the SCR catalyst.

In still other embodiments, the methods described herein may further comprise subjecting the SCR catalyst to one or more wet chemical cleaning processes and a drying process either prior to or after treating the SCR catalyst with the blasting stream. Wet chemical cleaning may include cleaning to remove contaminants and poisons from the catalyst surface and pores, typically called rejuvenation, and may further include re-impregnation of the catalyst with active metal components, typically called regeneration. Wet chemical cleaning, rejuvenation, or regeneration processes may include washing or treating the SCR catalyst with aqueous or non-aqueous solutions to remove particulate materials, chemical contaminants and catalyst poisons, for example, by dislodging the materials, dissolving the materials or chemically reacting with the materials (for example to form a compound that is soluble in aqueous solutions and/or the wash solvent). When the SCR catalyst is subjected to a wet chemical cleaning, rejuvenation, or regeneration process prior to the blasting treatment described herein, the SCR catalyst will typically be dried, for example, by heating and/or by blowing hot or dry air on the catalyst, to remove any residual moisture from the wet cleaning process prior to treating the catalyst to the blasting treatment. Drying may include a calcination process in which the temperature that the catalyst is subjected to ranges from about 400° C. to about 450° C.

Other specific dry cleaning and wet chemical cleaning processes and methods that may be used in combination with either prior to or after the methods described herein, include various processes described in U.S. Pat. Nos. 6,299,695; 6,387,836; 7,723,251; and 7,741,239 and U.S. Application Publication Nos. 2007/0161509; 2008/0115800; 2009/0209417; and 2009/0239735, the disclosures of each of which are incorporated herein in their entirety by this reference.

According to the various embodiments described herein where the SCR catalyst is also subjected to a dry-cleaning process and/or a wet cleaning process in addition to the blasting treatment described herein, the order of the treatment processed may vary as desired. For example, in one embodiment, the SCR catalyst may be treated with the blasting process prior to any dry-cleaning or wet-cleaning process. In another embodiment, the SCR catalyst may be subjected to a dry-cleaning process then treated with the blasting process described herein and optionally then treated with a wet chemical cleaning process. In still another embodiment, the SCR catalyst may be subjected to a dry-cleaning process and a wet cleaning process and then dried and/or calcined and treated with a blasting process as described herein.

In specific embodiments, the SCR catalyst may be optionally further regenerated, for example by re-impregnating the SCR catalyst with one or more catalytically active metal compounds. Re-impregnating the SCR catalyst may be done on the wet catalyst or, alternatively after the catalyst has dried. For example, during the intended use (i.e., removing one or more components from a power plant flue gas) and/or during various treating/regeneration processes of the catalyst, the catalytic activity of the catalyst may become diminished due to, for example, loss or deactivation (poisoning) of a portion of the one or more catalytically active metal compounds in the SCR catalyst. Re-impregnating the rejuvenated SCR catalyst may include impregnation with one or more catalytically active metal compounds, such as oxides of these metals, selected from the group consisting of vanadium compounds, molybdenum compounds, and tungsten compounds. In other embodiments, the regenerated SCR catalyst may further be re-calcined, for example, to improve the mechanical strength and structural integrity of the regenerated catalyst.

Specific embodiments of the present disclosure provide a method for removing accumulated particulates from an SCR catalyst, such as a honeycomb-, corrugated-, or plate-type SCR catalyst or other SCR catalyst structure. The method may comprise the steps of treating the SCR catalyst with a blasting stream comprising a pressurized carrier gas and dry ice ($CO_2(s)$) particulates directed at at least one surface of the SCR catalyst, and removing at least a portion of accumulated particulates from the SCR catalyst. According to certain embodiments, the accumulated particulates may comprise fly ash particulates, such as fly ash dust, large particle ash, popcorn ash, large chunky ash and combinations of any thereof, such as described above. In specific embodiments, the method may further comprise removing at least a portion of one or more colored deposits from an end of the SCR catalyst, as described herein. Removing the one or more colored deposits may be effected by either treating the SCR catalyst with the dry-ice blasting stream or, alternatively, by treating the SCR catalyst with a blasting stream comprising an abrasive blasting material, such as described herein, after treating the SCR catalyst with the dry-ice blasting stream. Combinations of these embodiments of the method with any other step, process or feature described or detailed herein is also envisioned.

Another embodiment of the present disclosure describes a method for removing accumulated particulates and/or one or more colored compounds from an SCR catalyst comprising treating an SCR catalyst with a blasting stream comprising a pressurized gas and an abrasive particulate blasting medium directed at at least one surface of the SCR catalyst; and removing at least a portion of the accumulated particulates and/or one or more colored compounds from the SCR catalyst. According the specific embodiments, the abrasive particulate blasting medium comprises a particulate selected from the group consisting of aluminum oxide particulates, sand or silica particulates, silicon carbide particulates, crushed glass, glass beads, plastic beads, pumice, steel shot, steel grit, corn cob particulates, nut shell particulates, soda particulates, ice particulates, and combinations of any thereof. Specific details of the abrasive blasting media are described in detail herein. According to certain embodiments, the accumulated particulates may comprise fly ash particulates, such as fly ash dust, large particle ash, popcorn ash, large chunky ash and combinations of any thereof, such as described above. In specific embodiments involving removal of accumulated particulates, the method may further comprise removing at least a portion of one or more colored deposits from an end of the SCR catalyst, as described herein. In specific embodiments, all or the majority of accumulated particulates may have been previously removed by one or more other cleaning processes, including but not limited to dry ice blasting, dry-cleaning or wet chemical cleaning, prior to treating the SCR catalyst with an abrasive blasting step to remove one or more colored compounds from a surface or end of the catalyst. Combinations of these embodiments of the method with any other step, process or feature described or detailed herein is also envisioned.

The present disclosure also includes a regenerated SCR catalyst that is substantially free of fly ash particulates, wherein the SCR catalyst has been regenerated from an SCR catalyst having from about 15% to about 100% blockage from fly ash particulates using any of the various embodiments of the methods described herein. In a specific embodiment, the regenerated SCR catalyst may have up to about 100% of the fly ash particulate blockage removed by the methods herein, or in a particular embodiment from about 10% to about 100%, or even from about 50% to about 100% of the fly ash particulate blockage removed. According to particular embodiments, the SCR catalyst that is substantially free of fly ash particulates may also be treated with one or more additional dry-cleaning, wet chemical cleaning, re-impregnation, or calcinations steps as detailed herein.

The process described herein should not be limited to the use of a blasting stream comprising a pressurized carrier gas and a particulate blasting material. Any other suitable methods for accelerating a particulate blasting material at a surface of the one or more components of an SCR system or the SCR catalyst may also have a similar effect as the described blasting stream and is within the scope of the present methods. For example, use of centrifugal acceleration (for example with a centrifugal wheel) or other acceleration means is contemplated. Thus, for example, the present disclosure would also include a method for removing accumulated particulates and/or one or more colored deposits from at least one surface of one or more components of an SCR system or an SCR catalyst, where the method comprises accelerating a particulate blasting medium, such as those detailed herein, at least one surface of the one or more components of the SCR system or SCR catalyst and removing at least a portion of the accumulated particulate material and/or at least a portion of the one or more colored deposits from the surface of the one or more components of the SCR system or SCR catalyst. Combinations of this method with other embodiments described herein are also envisioned.

While various specific embodiments have been described in detail herein, the present disclosure is intended to cover various different combinations of the disclosed embodiments and is not limited to any specific embodiments described herein. The various embodiments of the present disclosure may be better understood when read in conjunction with the following representative examples. The following representative examples are included for purposes of illustration and not limitation.

EXAMPLES

Dry ice blasting and abrasive blasting equipment is commercially available and most commercially available equipment would be suited for the methods described herein. The dry ice blasting examples herein utilized a Phoenix Model PHX 150 dry ice cleaning system, commercially available from Phoenix Unlimited LLC, Corona, Calif., in conjunction with a standard 24" rectangular, high flow/210 SCMF nozzle, 14" fan nozzle high flow/175 SCMF nozzle, and RED pellet fragmenter attachment.

Example 1

Figure 1B:

A honeycomb SCR catalyst module having an average fly ash pluggage of greater than 80% (FIG. 1A) was treated using dry ice blasting in both the vertical (on a cleaning table) and horizontal position. After treatment the SCR catalyst module had less than about 10% pluggage of fly ash (FIG. 1B). Even though some channels in the SCR catalyst were not completely unplugged after the treatment, the fly ash was partially removed from the channels rendering the channels open and accessible for wet cleaning chemicals applied during subsequent cleaning/regeneration steps.

Example 2

Figure 2A:
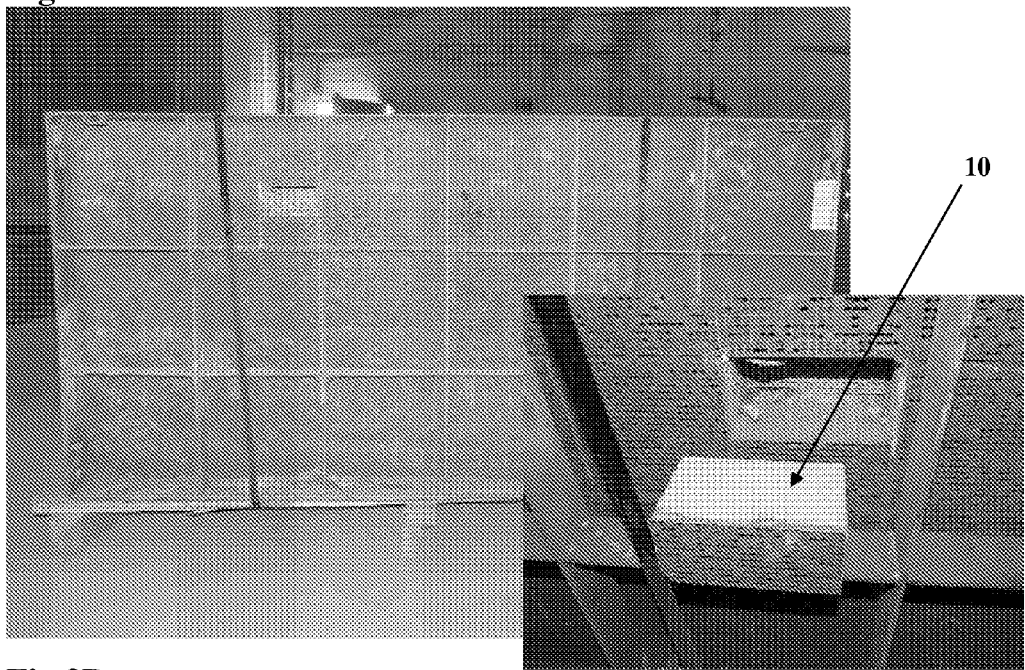
FIG. 2A illustrates a honeycomb SCR catalyst with fly ash plugs prior to treatment with an inset showing a removed block of catalyst for XRF analysis and FIG. 2B shows the same honeycomb SCR catalyst after treatment with dry ice blasting according to one embodiment of the present disclosure.
Figure 2B:
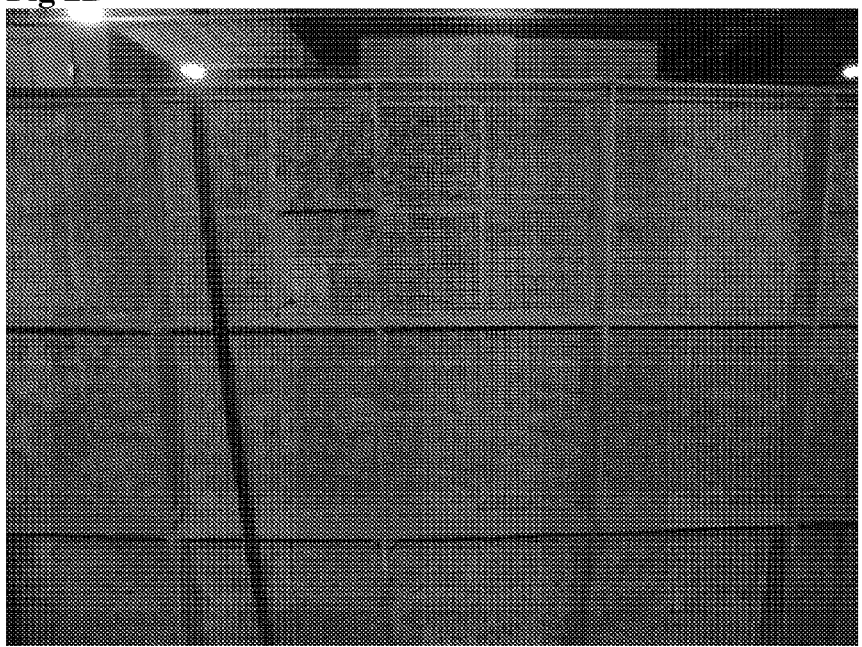

A honeycomb SCR catalyst module having an average fly ash pluggage of greater than 90% (FIG. 2A) was treated using dry ice blasting in the horizontal position. After treatment the SCR catalyst module had less than about 20% pluggage of fly ash (FIG. 2B).

To examine the effect of the dry-ice blasting on the catalyst composition, one log(10) of the test module was selected (FIG. 2A inset) and a sample taken prior to blasting process and a second log of the test module was removed after the treatment process. The inlet of the samples were then analyzed using X-Ray Fluorescent (XRF) Technology both at the surface of the catalyst and in the bulk. Table 1 shows the catalyst composition using XRF before and after treatment and confirms that the catalyst composition was not changed by the treatment process.

TABLE 1

XFR Data of Honeycomb SCR Catalyst Composition

| Compound | Unit | Before Ice-Blasting | | After Ice-Blasting | |
| --- | --- | --- | --- | --- | --- |
| | | Inlet Surface | Inlet Bulk | Inlet Surface | Inlet Bulk |
| $SiO_2$ | % | 16.71 | 10.66 | 15.33 | 10.19 |
| $Al_2O_3$ | % | 2.76 | 2.88 | 3.01 | 2.81 |
| $Fe_2O_3$ | % | 2.68 | 2.39 | 2.98 | 2.73 |
| $TiO_2$ | % | 52.28 | 61.97 | 52.58 | 62.59 |
| CaO | % | 3.28 | 2.25 | 3.12 | 2.21 |
| MgO | % | 0.31 | 0.49 | 0.45 | 0.44 |
| BaO | % | 0.00 | 0.00 | 0.00 | 0.00 |
| $Na_2O$ | % | 1.27 | 1.30 | 1.62 | 1.20 |
| $K_2O$ | % | 0.49 | 0.67 | 0.49 | 0.60 |
| $SO_3$ | % | 13.08 | 9.43 | 13.16 | 9.25 |
| $P_2O_5$ | % | 0.42 | 0.41 | 0.40 | 0.41 |
| $V_2O_5$ | % | 0.22 | 0.27 | 0.24 | 0.25 |
| $WO_3$ | % | 5.65 | 6.88 | 5.82 | 6.96 |
| $MoO_3$ | % | 0.12 | 0.14 | 0.13 | 0.12 |
| As | ppm | 1400 | 814 | 1400 | 716 |
| $Cr_2O_3$ | % | 0.02 | 0.02 | 0.02 | 0.02 |

Example 3

Figure 3A:
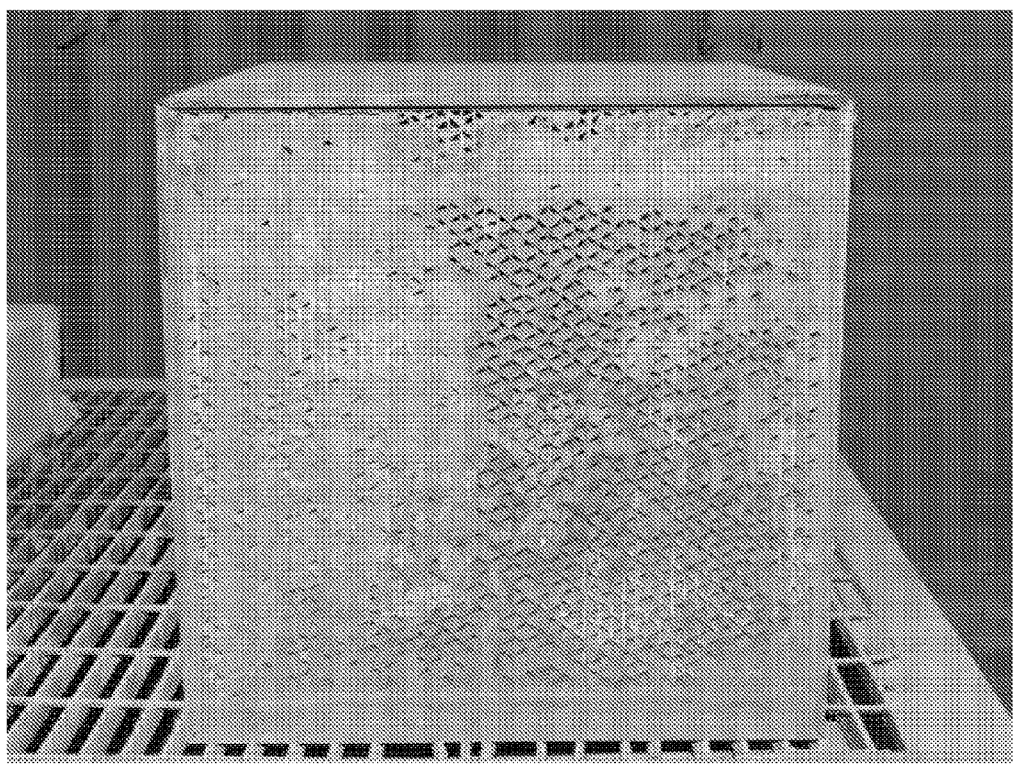
FIG. 3A illustrates a corrugated SCR catalyst with fly ash plugs prior to treatment and FIG. 3B shows the same corrugated SCR catalyst after treatment with dry ice blasting according to one embodiment of the present disclosure.
Figure 3B:
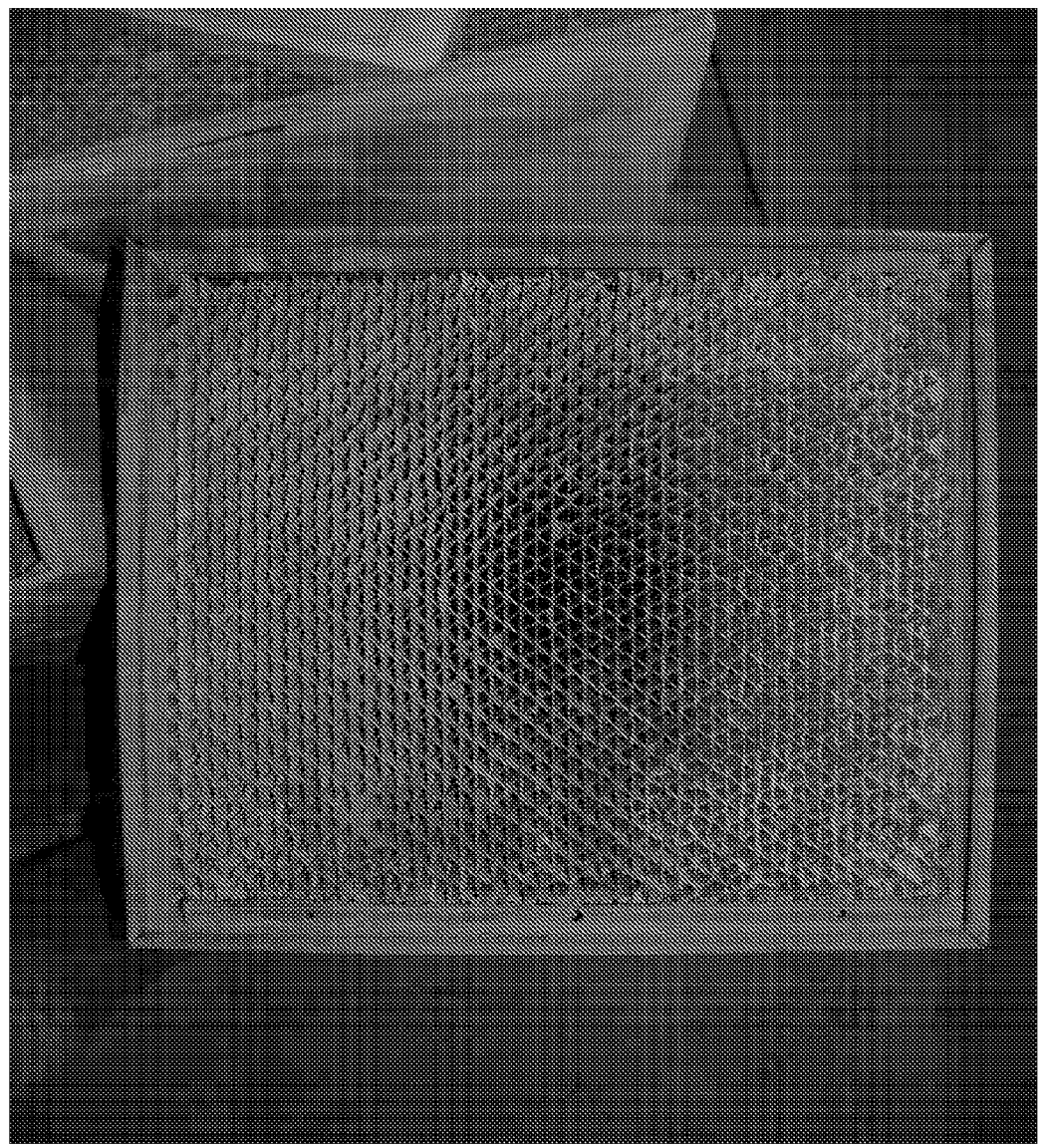

A corrugated SCR catalyst box having an average fly ash pluggage of greater than 40% (FIG. 3A) was treated using dry ice blasting in the horizontal position. After treatment the SCR catalyst box had less than about 10% pluggage of fly ash (FIG. 3B).

Example 4

Figure 4A:
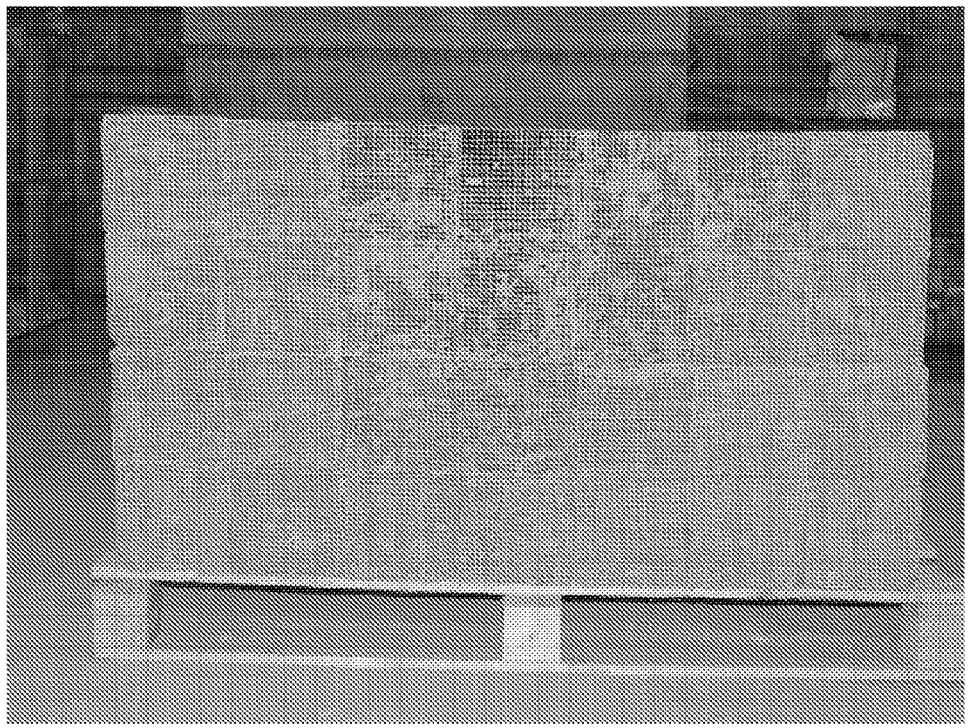
FIG. 4A illustrates a honeycomb SCR catalyst with fly ash plugs prior to treatment and FIG. 4B shows the same honeycomb SCR catalyst after treatment with dry ice blasting according to one embodiment of the present disclosure.
Figure 4B:

A honeycomb SCR catalyst module was treated to a wet chemical rejuvenation process, dried and then treated to the dry ice blasting process in the horizontal position. The wet chemical rejuvenation process included treating the catalyst to a water wash, a caustic treatment, a neutralization, and a final water wash in the form of a cascade and then subsequently dried. The catalyst had an average fly ash pluggage of greater than 25% (FIG. 4A) after the wet chemical treatment and drying but before the dry ice blasting treatment. After treatment with the dry ice blasting, the fly ash was almost completely removed from the SCR catalyst module (FIG. 4B).

Example 5

Figure 5A:
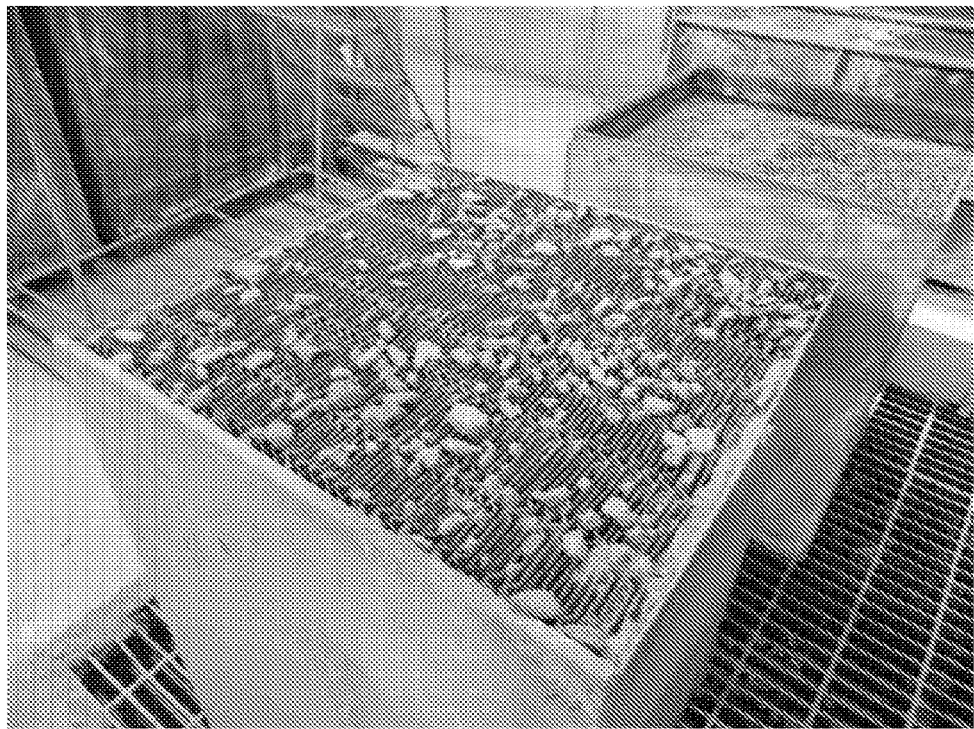
FIG. 5A illustrates a plate SCR catalyst with fly ash plugs prior to treatment and FIG. 5B shows the same plate SCR catalyst after treatment with dry ice blasting according to one embodiment of the present disclosure.
Figure 5B:
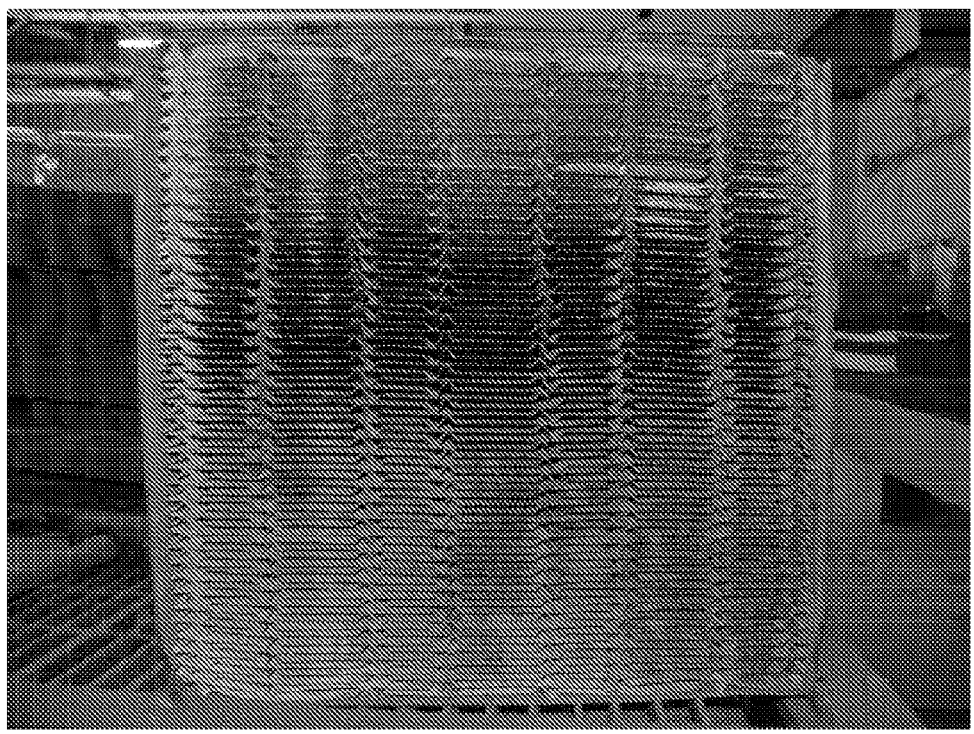

A plate SCR catalyst module having an average fly ash pluggage of greater than 95% (FIG. 5A) was scraped to remove large fly ash chunks on the exterior and then treated using dry ice blasting in the vertical position. After treatment with the dry ice blasting, the fly ash was almost completely removed from the SCR catalyst module (FIG. 5B).

Example 6

A honeycomb SCR catalyst was treated with the dry ice blasting technology in the horizontal position. Portions of the module with less than 10% fly ash pluggage prior to dry ice blasting were chosen to ensure that contamination was uniform within a log that was removed from the catalyst for XRF testing. The front end and the inlet (after 2 inches) of two logs from different portions of the module were analyzed using XRF Technology before and after the treatment. The results were examined to determine if the dry ice blasting process changed the chemical composition of the catalyst material. The XRF data from the log from module 1 is presented in Table 2 and the XRF data from the log in module 2 is presented in Table 3. It can be seen from these results that dry ice blasting had no significant effect on the chemical composition of the catalyst. The data indicated that the dry ice blasting may have had a positive effect on $SiO_2$ and $Al_2O_3$ blinding layer removal at the front end of the catalyst.

TABLE 2.

XRF Data for Honeycomb Catalyst Portion 1

| | | Front End | | | | Inlet After 2 Inches | | | |
| --- | --- | --- | --- | --- | --- | --- | --- | --- | --- |
| | | Before Ice-blasting | | After Ice-Blasting | | Before Ice-blasting | | After Ice-Blasting | |
| | | Surface | Bulk | Surface | Bulk | Surface | Bulk | Surface | Bulk |
| $SiO_2$ | % | 21.12 | 5.57 | 20.88 | 5.52 | 18.62 | 5.20 | 19.77 | 5.10 |
| $Al_2O_3$ | % | 4.67 | 1.67 | 5.31 | 1.67 | 4.73 | 1.50 | 4.44 | 1.43 |
| $Fe_2O_3$ | % | 0.79 | 0.34 | 0.81 | 0.35 | 0.94 | 0.18 | 0.82 | 0.15 |
| $TiO_2$ | % | 50.70 | 75.40 | 45.21 | 75.81 | 54.89 | 76.73 | 53.61 | 77.16 |
| CaO | % | 3.44 | 2.38 | 4.02 | 2.40 | 2.91 | 2.29 | 3.13 | 2.24 |
| MgO | % | 0.18 | 0.15 | 0.16 | 0.15 | 0.18 | 0.13 | 0.18 | 0.13 |
| BaO | % | 1.69 | 3.49 | 1.56 | 3.38 | 2.08 | 3.60 | 1.66 | 3.24 |
| $Na_2O$ | % | 1.12 | 0.20 | 2.19 | 0.15 | 0.82 | 0.11 | 0.88 | 0.10 |
| $K_2O$ | % | 0.33 | 0.36 | 0.45 | 0.33 | 0.29 | 0.23 | 0.28 | 0.25 |
| $SO_3$ | % | 10.78 | 4.06 | 13.59 | 3.90 | 8.76 | 3.64 | 9.73 | 3.61 |
| $P_2O_5$ | % | 0.37 | 0.10 | 0.33 | 0.09 | 0.33 | 0.09 | 0.37 | 0.09 |
| $V_2O_5$ | % | 0.28 | 0.34 | 0.28 | 0.34 | 0.31 | 0.35 | 0.25 | 0.31 |
| $WO_3$ | % | 3.75 | 5.21 | 3.60 | 5.24 | 4.11 | 5.30 | 3.91 | 5.38 |
| $MoO_3$ | % | 0.11 | 0.16 | 0.11 | 0.14 | 0.16 | 0.13 | 0.15 | 0.17 |
| As | ppm | 3300 | 2842 | 3300 | 2600 | 4500 | 2561 | 4100.00 | 3291 |
| $Cr_2O_3$ | % | 0.03 | 0.02 | 0.03 | 0.01 | 0.03 | 0.01 | 0.03 | 0.01 |

TABLE 3

XRF Data for Honeycomb Catalyst Portion 2

| | | Front End | | | | Inlet After 2 Inches | | | |
| --- | --- | --- | --- | --- | --- | --- | --- | --- | --- |
| | | Before Ice-Blasting | | After Ice-Blasting | | Before Ice-Blasting | | After Ice-Blasting | |
| | | Surface | Bulk | Surface | Bulk | Surface | Bulk | Surface | Bulk |
| $SiO_2$ | % | 26.07 | 5.28 | 22.86 | 5.23 | 23.07 | 5.16 | 23.14 | 5.69 |
| $Al_2O_3$ | % | 4.84 | 1.51 | 4.32 | 1.48 | 4.30 | 1.49 | 4.02 | 1.79 |
| $Fe_2O_3$ | % | 0.85 | 0.22 | 0.73 | 0.19 | 0.68 | 0.24 | 0.75 | 0.38 |
| $TiO_2$ | % | 40.15 | 76.30 | 49.56 | 76.23 | 51.26 | 76.97 | 50.85 | 76.02 |
| CaO | % | 5.02 | 2.38 | 3.59 | 2.34 | 3.38 | 2.23 | 3.29 | 2.33 |
| MgO | % | 0.18 | 0.15 | 0.19 | 0.16 | 0.16 | 0.16 | 0.16 | 0.16 |
| BaO | % | 1.51 | 3.36 | 1.62 | 3.49 | 1.69 | 3.09 | 1.71 | 3.11 |
| $Na_2O$ | % | 0.60 | 0.18 | 0.41 | 0.22 | 0.48 | 0.13 | 0.38 | 0.12 |
| $K_2O$ | % | 0.83 | 0.35 | 0.38 | 0.37 | 0.26 | 0.28 | 0.27 | 0.27 |
| $SO_3$ | % | 14.59 | 3.97 | 10.27 | 4.04 | 9.31 | 3.89 | 8.97 | 3.80 |
| $P_2O_5$ | % | 0.32 | 0.09 | 0.36 | 0.09 | 0.36 | 0.09 | 0.38 | 0.08 |

TABLE 3-continued

XRF Data for Honeycomb Catalyst Portion 2

| | | Front End | | | | Inlet After 2 Inches | | | |
| | | Before Ice-Blasting | | After Ice-Blasting | | Before Ice-Blasting | | After Ice-Blasting | |
| | | Surface | Bulk | Surface | Bulk | Surface | Bulk | Surface | Bulk |
|---|---|---|---|---|---|---|---|---|---|
| $V_2O_5$ | % | 0.27 | 0.35 | 0.28 | 0.35 | 0.27 | 0.31 | 0.32 | 0.30 |
| $WO_3$ | % | 3.27 | 5.14 | 3.74 | 5.14 | 3.88 | 5.22 | 3.89 | 5.16 |
| $MoO_3$ | % | 0.12 | 0.16 | 0.12 | 0.15 | 0.15 | 0.16 | 0.16 | 0.18 |
| As | ppm | 3300 | 269 | 3400 | 2491 | 3700 | 2971 | 4200 | 3173 |
| $Cr_2O_3$ | % | 0.02 | 0.01 | 0.03 | 0.01 | 0.02 | 0.01 | 0.03 | 0.01 |

Example 7

Figure 6:
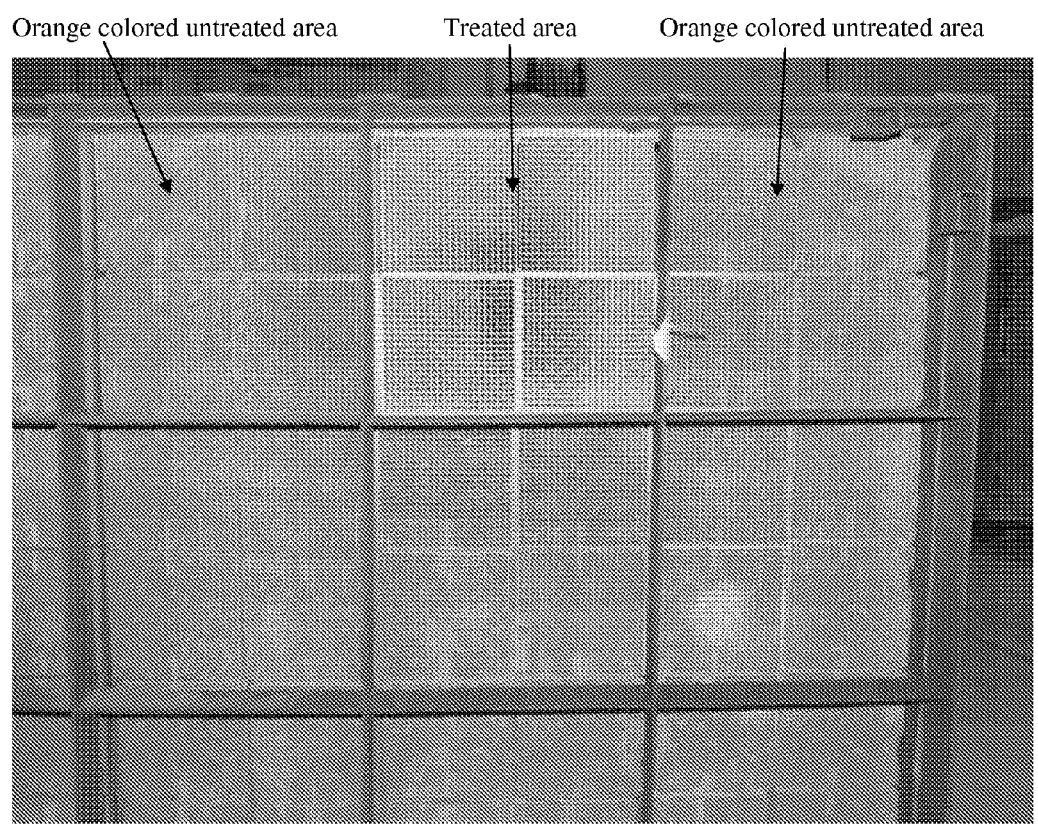
FIG. 6 shows a honeycomb SCR catalyst having orange colored deposits where one section of the catalyst has been treated with an abrasive blasting media according to one embodiments of the present disclosure to remove one or more orange colored compounds from the front surface of the catalyst (top center area)

In this Example, a honeycomb SCR catalyst having an orange front end discolorization was treated with the abrasive blasting technology described herein. One area of a module of SCR catalyst was treated with aluminum oxide blasting stream (FIG. 6 center top area) while the other areas of the catalyst were left untreated. The blasting treatment successfully removed the orange colored deposits from the blasted catalyst area. The penetration and color removal was to a depth of approximately 10 mm to 15 mm from the channel inlet. The treatment caused a slight abrasion to the underlying ceramic material.

Example 8

Figure 7:
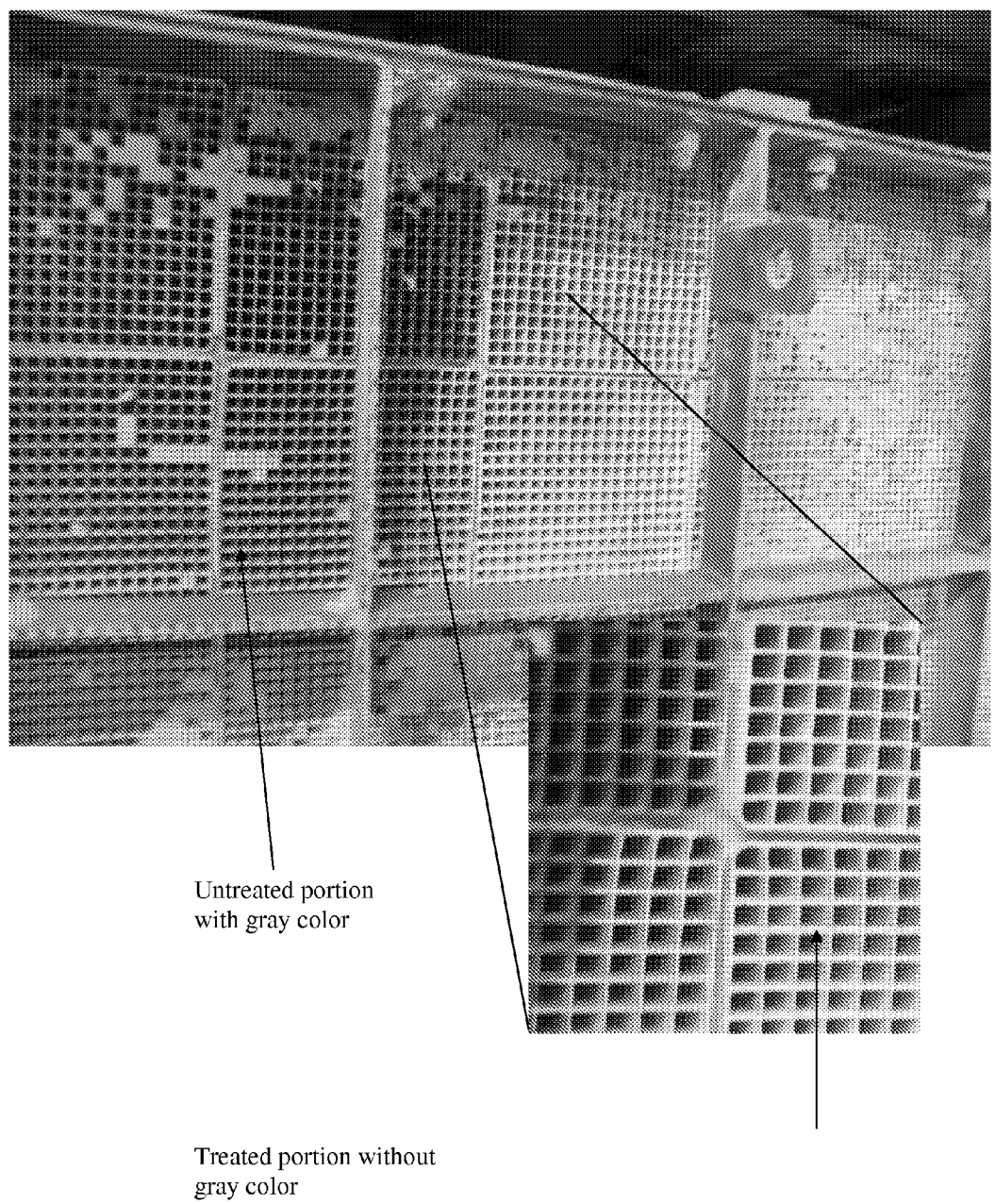
FIG. 7 shows a honeycomb SCR catalyst having gray colored deposits where a portion of the catalyst has been treated with an abrasive blasting media according to one embodiments of the present disclosure to remove one or more gray colored compounds from the front surface of the catalyst (see inset).

In this Example, a honeycomb SCR catalyst having orange/gray front end discoloration was treated with the abrasive blasting technology described herein. A portion of the SCR catalyst was treated with an aluminum oxide blasting stream (FIG. 7) while the remainder of the catalyst was left untreated. The blasting treatment successfully removed the orange and gray colored deposits from the treated portion of the catalyst. The penetration and color removal was to a depth of approximately 10 mm to 15 mm from the channel inlet. The treatment caused a slight abrasion to the underlying ceramic material.

We claim:

1. A method for removing accumulated fly ash from components of an SCR system comprising:
   treating an SCR catalyst with a blasting stream comprising a pressurized carrier gas and a particulate blasting medium directed at a flue gas inlet side of the SCR catalyst; and
   removing at least a portion of accumulated fly ash from the SCR catalyst.

2. The method of claim 1, wherein the accumulated fly ash comprises fly ash particulates, fly ash dust, large particle ash, popcorn ash, chunky fly ash pieces, or combinations thereof.

3. The method of claim 1, wherein the particulate blasting medium is dry ice particulates.

4. The method of claim 1, wherein the particulate blasting medium comprises a particulate selected from the group consisting of aluminum oxide particulates, sand or silica particulates, silicon carbide particulates, crushed glass, glass beads, plastic beads, pumice, steel shot, steel grit, corn cob particulates, nut shell particulates, soda particulates, ice particulates, and combinations of any thereof.

5. The method of claim 1, wherein the blasting stream is directed at the flue gas inlet side of the SCR catalyst through a nozzle and the blasting stream leaves the nozzle at a pressure ranging from about 17.4 psig to about 4000 psig and wherein the carrier gas is selected from the group consisting of air, nitrogen, carbon dioxide, an inert gas, and mixtures of any thereof.

6. The method of claim 1, wherein treating the SCR catalyst is performed on the SCR catalyst in-situ while installed in the normal location of operation or ex-situ while removed from its normal location of operation.

7. The method of claim 1, wherein the SCR catalyst is treated in at least one of a vertical position and a horizontal position.

8. The method of claim 1, wherein the SCR catalyst has a catalyst structure selected from the group consisting of a honeycomb catalyst, a corrugated catalyst, and a plate catalyst.

9. The method of claim 1, further comprising subjecting the SCR catalyst to a dry cleaning process comprising at least one of vacuuming, air blowing, shaking the catalyst, scraping a catalyst surface, or poking a channel of the catalyst to remove at least a portion of the accumulated fly ash, either before or after the treating process.

10. The method of claim 1, further comprising removing at least a portion of one or more colored iron deposits from an end of the SCR catalyst using the blasting stream.

11. The method of claim 1, further comprising subjecting the SCR catalyst to a wet chemical cleaning process and drying the SCR catalyst either prior to or after the treating process.

12. The method of claim 1, further comprising subjecting the SCR catalyst to a wet chemical cleaning process and re-impregnating the SCR catalyst with one or more catalytically active metals.

13. A method for removing accumulated fly ash from an SCR catalyst comprising:
   treating an SCR catalyst with a blasting stream comprising a pressurized carrier gas and dry ice particulates directed at a flue gas inlet side of the SCR catalyst; and
   removing at least a portion of accumulated fly ash from the SCR catalyst.

14. The method of claim 13, wherein the accumulated fly ash comprises fly ash particulates, fly ash dust, large particle ash, popcorn ash, chunky fly ash pieces, or combinations thereof.

15. The method of claim 13, wherein treating the SCR catalyst with the blasting stream further comprises:
   removing at least a portion of one or more colored iron deposits from an end of the SCR catalyst.

16. A method for removing accumulated fly ash from an SCR catalyst comprising:
   treating an SCR catalyst with a blasting stream comprising a pressurized carrier gas and an abrasive particulate blasting medium directed at a flue gas inlet side of the SCR catalyst; and removing at least a portion of accumulated fly ash from the SCR catalyst, wherein the abrasive particulate blasting medium comprises a particulate selected from the group consisting of aluminum oxide particulates, sand or silica particulates, silicon carbide particulates, crushed glass, glass beads, plastic beads, pumice, steel shot, steel grit, corn cob particulates, nut shell particulates, soda particulates, ice particulates, and combinations of any thereof.

17. The method of claim 16, wherein the accumulated fly ash comprises fly ash particulates, fly ash dust, large particle ash, popcorn ash, chunky fly ash pieces, or combinations thereof.

18. The method of claim 16, wherein treating the SCR catalyst with the blasting stream further comprises:
removing at least a portion of one or more colored iron deposits from an end of the SCR catalyst.

* * * * *